US 7,898,553 B2

(12) United States Patent
Smith

(10) Patent No.: US 7,898,553 B2
(45) Date of Patent: Mar. 1, 2011

(54) PICK PACKET FOR WEB BROWSER DISPLAY

(75) Inventor: Adrian Chamberland Smith, Topsham, ME (US)

(73) Assignee: Delorme Publishing Co., Yarmouth, ME (US)

( * ) Notice: Subject to any disclaimer, the term of this patent is extended or adjusted under 35 U.S.C. 154(b) by 1109 days.

(21) Appl. No.: 11/583,384

(22) Filed: Oct. 19, 2006

(65) Prior Publication Data

US 2008/0095472 A1 Apr. 24, 2008

(51) Int. Cl.
*G09G 5/00* (2006.01)

(52) U.S. Cl. .......................................... 345/642; 345/629

(58) Field of Classification Search .................. None
See application file for complete search history.

(56) References Cited

U.S. PATENT DOCUMENTS

| | | | |
|---|---|---|---|
| 4,847,605 A | 7/1989 | Callahan et al. | |
| 4,876,644 A | 10/1989 | Nuechterlein et al. | |
| 5,202,671 A | 4/1993 | Aranda et al. | |
| 5,255,359 A | 10/1993 | Ebbers et al. | |
| 5,371,514 A | 12/1994 | Lawless et al. | |
| 5,748,946 A | 5/1998 | Schneider | |
| 5,937,417 A * | 8/1999 | Nielsen | 715/207 |
| 5,961,569 A | 10/1999 | Craport et al. | |
| 6,078,935 A * | 6/2000 | Nielsen | 715/207 |
| 6,275,241 B1 | 8/2001 | Tanaka | |
| 6,295,371 B1 * | 9/2001 | Rucklidge et al. | 382/176 |
| 6,404,432 B1 * | 6/2002 | Simpson | 345/440 |
| 6,538,675 B2 | 3/2003 | Aratani et al. | |
| 6,664,990 B1 * | 12/2003 | Bates et al. | 715/857 |
| 6,680,976 B1 * | 1/2004 | Chen et al. | 375/240.26 |
| 6,727,906 B2 * | 4/2004 | Lockeridge et al. | 345/581 |
| 6,874,059 B1 * | 3/2005 | Russ | 711/111 |
| 6,981,097 B2 * | 12/2005 | Martin et al. | 711/130 |
| 7,134,095 B1 * | 11/2006 | Smith et al. | 715/860 |
| 2004/0145592 A1 * | 7/2004 | Twersky | 345/619 |
| 2006/0061595 A1 * | 3/2006 | Goede et al. | 345/619 |

* cited by examiner

*Primary Examiner* — M Good Johnson
(74) *Attorney, Agent, or Firm* — Patricia M. Mathers

(57) ABSTRACT

A method of generating a pick packet for use by a web browser. The pick packet has secondary string buffer that assigns a unique token to each unique object or unique combination of objects and a primary string buffer that associates a token with each pixel in the source image. A description or legend is associated with the tokens in the secondary string buffer. When a pointer device hovers over a pixel in the source image, the browser looks in the primary buffer for the toke associated with that pixel, then retrieves the legend associated with that token, if any, from the secondary buffer.

9 Claims, 6 Drawing Sheets

| SUMMARY DATA FILE | | |
|---|---|---|
| Token | Objects | Description |
| T1 | 120 | (no legend) |
| | | |
| | | |
| | | |
| | | |
| | | |

FIG. 3B

| SUMMARY DATA FILE | | |
|---|---|---|
| Token | Objects | Description |
| T1 | 120 | (no legend) |
| T2 | 110A | US Route 1 |
| | | |
| | | |
| | | |
| | | |

FIG. 3C

| SUMMARY DATA FILE | | |
|---|---|---|
| Token | Objects | Description |
| T1 | 120 | (no legend) |
| T2 | 110A | US Route 1 |
| T3 | 140 | Sandy Brook |
| T4 | 140 and 110A | US Route 1 Sandy Brook Bridge |
| | | |
| | | |

FIG. 3D

| SUMMARY DATA FILE | | |
|---|---|---|
| Token | Objects | Description |
| T1 | 120 | (no legend) |
| T2 | 110A | US Route 1 |
| T3 | 140 | Sandy Brook |
| T4 | 140 and 110A | US Route 1 Sandy Brook Bridge |
| T5 | 150 | (no legend) |
| T6 | 150 and 140 | Sandy Brook |

PICK PACKET FOR WEB BROWSER DISPLAY

BACKGROUND INFORMATION

1. Field of the Invention

The invention relates to the field of web browsers. More particularly, the invention relates to a method of retrieving information relating to an image displayed on a web browser.

2. Description of the Prior Art

When perusing information on an Internet webpage, using a web browser, it is quite common that a viewer is able to call up supplemental information related to the information presented on the webpage by allowing a cursor to hover over a location of interest. The location of interest shall be referred to hereinafter as the "source image." The cursor is controlled by a pointer device and, as used hereinafter, the term "pointer device" shall include all types of such devices, including, but not limited to: mouse, joy stick, light pen, etc. The supplemental information is hidden in a pick-information element, also called a "hot spot" or an "embedded object," which is an object that is embedded in the web page near to the source image". The movement or hovering of a pointer-device over the embedded object triggers the browser to execute one or more events that pop up the supplemental information.

This technique works well for providing point information pertaining to a small individual source image, since it is a relatively simple matter to construct a single embedded object at a specific location. The technique does not work so well, however, when the supplemental information is linked to an image that is irregular in shape and/or stretches over a long distance across the webpage. A geographical map will have many features and points of interest, such as, for example, bodies of water, mountains, etc., and man-made structures, such as roads, buildings, and other structures. In addition to features that are shown on the map, commercial or cultural places, such as stores or theaters, etc., may also represent points of interest. While such points of interest may not be shown on the map itself, it may be desirable to have supplemental information pertaining to them pop up when the cursor hovers over the images where these points of interest are located.

There are several difficulties today with providing the supplemental information in a timely fashion. One difficulty lies in the fact that features on a map are frequently not small square shapes, but may be large and irregularly shaped bodies, such as a lake or a long and meandering road or river, which extends as a slender irregularly shaped element across the entire webpage. For the sake of simplicity, such elements of long and meandering shapes, or of any shape that cannot be easily composed of rectangular elements, are referred to hereinafter as irregular elements. Ideally, information related to such an irregular element should pop up anywhere along the element where the viewer allows the cursor to hover. This is not the case today, for technical reasons. Information is provided today at only one or just a few discrete locations along the irregular element and the viewer has to move the cursor along the element until it lands on the hidden object and the information pops up. Browsers currently handle only a relatively small number of total hidden objects, before performance degradation sets in. In addition, the objects must be constructed as polygonal shapes with regular perimeters, that is, as rectangles, circles, triangles, or other easily defined regular shapes. Most typically, objects are constructed of squares. In order for a hidden object to approximate an irregular element, such as a road or odd-shaped region, many small embedded squares would have to be constructed and precisely placed alongside the irregular element.

Typically, web page designers use Java Script and DHTML (Dynamic HTML) to lay out the objects or hot spots on interactive images and to move images around. Interactive images in DHTML often have actions associated with them. For example, when a viewer clicks on a DHTML image, the viewer's browser pops up a text field that contains supplemental information relating to the image. The conventional browser cannot handle very many hot spots or hover objects. Hot spots eat up memory and just having many hot spots embedded in a page makes the browser inefficient and sluggish. Pointer devices can be moved relatively quickly across a web page, with the result that the mouse travels much faster across objects than the processing capability of the browser. This creates a lag time, and it is a common occurrence that as the mouse traverses objects A, B, C, and D, to land on an object E, for example, the browser gets hung up on trying to retrieve the information to object B, C, or D.

An additional difficulty is that current browser technology does not bring up information from "stacked" objects. Stacked objects are multiple objects that overlap each other, at least partially, in the X and Y directions, and are stacked, that is, stored in layers, in the Z direction, the Z direction being perpendicular to the plane of the computer screen. It is conceivable that one particular element on a map would have several objects associated with it. For example, a train station or a shopping mall may be depicted as a relatively small element, but contain multiple different objects, such as rail lines going through the station, as well as shops, cinemas, coffee shops, restaurants, flower shops, etc. in the station. These multiple objects, the train station, the rail lines, the shops and restaurants are stacked, one on top of the other in the Z direction. Today, the object on the topmost Z layer is presented to the viewer, and the rest ignored. It may be desirable, however, to make the hidden objects or supplemental information associated with any one of the objects visible to the viewer.

What is needed, therefore, is a method of quickly identifying multiple stacked objects in a source image. What is further needed is such a method that readily provides information relating to such stacked objects to a web browser.

BRIEF SUMMARY OF THE INVENTION

"Picking" is a process of identifying one or more objects that occupy a pixel in an electronic image. The present invention is a method of bundling pick information for a source image displayed on a browser and storing the pick information in a compressed format for ready access by a browser. The method generates a pick packet from a pick packet matrix and a summary data table which store unique pick information for each pixel location in the source image. The pick packet matrix and summary data table are processed into two text files, which the browser retrieves via the http protocol and which are decoded by a Java Script program. The first file, referred to hereinafter as a "Pick Packet," is compressed with run-length encoding and stores information about each pixel of the displayed image. The second file, referred to hereinafter as a "Summary Data File," is a text file that provides user-friendly labels for each object or combination of objects at a pixel location.

For purposes of illustration only, a road map shall be relied upon in the description of the invention to serve as the "source image." This reliance in no way limits the scope of the method to road maps. Any image presented by a browser, for which it is desirable to show supplemental data, may be the "source image" for which pick information is gathered. A road map serves well as an illustrative example, because it is commonly understood that such a map presents an image that generally contains overlapping objects, such as, for example, roads intersecting with other roads or crossing other roads via an underpass or overpass, culturally significant structures which have labels attached to them, or structures that contain multiple commercial entities, some or all of which need to be identified on the image, etc.

The first step of the method according to the invention is to generate a pick packet matrix and a summary data table. The pick packet is not constructed from the source image itself, but from the data that is used to construct the source image, that is, from rendering software. The source image typically contains multiple objects and each object may have more than one graphical element or "primitive" associated with it, such as a polygon and a text box. The rendering software inspects the image data to determine which object or objects are to be displayed on the screen, and then determines which primitives are used to draw the objects. This process is repeated, object by object. The rendering software then renders the image by drawing the objects in a certain sequence, primitive by primitive. Typically, the rendering software will draw polygons first, then lines, then text. As it renders the image, the rendering software keeps track of each object that is drawn. The rendering software, thus, creates a list of objects as it renders the source image. This list can now be used to generate the pick packet according to the invention.

Pick-packet-generating software starts with the objects list from the rendering software and inspects the source image, object by object, to determine which pixels contain which objects. The software then generates a summary data table and a pick packet matrix. The summary data table contains a list of objects and combinations of objects, with a token assigned to each object or combination of objects. The pick packet matrix is a matrix of pixel coordinates that correspond to the pixel locations in the source image. Initially, the summary data table is empty of objects and each pixel coordinate in the pick packet matrix is assigned an "empty" token. The empty token indicates that no objects are contained on the pixel.

The second step of the method of generating a pick packet is to populate the pick packet matrix with tokens. The pick-packet-generating software inspects the source image, object by object, and determines which pixels in the source image contain which objects. For each pixel covered by a particular object, the pick-packet-generating software looks first in the pick packet matrix to see if a token has been assigned to the corresponding pixel coordinate and, if not, then looks in the summary data table to see whether the object is listed there and whether a token has been assigned to it. If yes, that token is placed in the pick packet matrix; if no, the object is listed in the summary data table and a token assigned to the object. Associated with the token is a user-friendly text that will appear on the display upon a certain trigger action, such as, for example, allowing the pointer device to hover over an object on the display. The token is then placed in the pick packet matrix at the pixel coordinate that corresponds to the pixel location in the source image. This step is a reiterative process, whereby the pick-packet-generating software loops through the source image looking for each pixel location covered by a particular object, then goes back to the pick packet matrix and the summary data table, to determine whether a token has been assigned to each pixel coordinate in the pick packet matrix that corresponds to a particular pixel location.

As the pick packet software works through the list of objects, it may or may not follow the same sequence adhered to by the rendering software. It is important for the rendering software to adhere to a pre-defined sequence, because some primitives are opaque, others transparent, and if the proper sequence is not followed, some objects that should be visible on the map will be obscured from view by other objects that should be hidden behind visible objects. With the pick packet, it is important that the final pick packet account for all objects on each pixel. The drawing sequence is generally unimportant, because the text that is displayed by the pick packet will identify all objects contained on the pixel, if so desired, regardless of whether the objects are visible in the image.

Each object may be composed of various types and number of primitives. A road is perhaps made up of a thick line of one color and a thin line of another color. A group of adjacent pixels that form an image may contain an identical combination of objects. For example, an image of a road intersection will contain at least three objects: one depicting the underlying terrain, another depicting the first road, and a third one depicting the second road; the image identifying a boat access on a lake or pond will contain at least two objects: one depicting the body of water, and the other the boat access. The boat access object does not have to be a depiction of a boat ramp, but may be a text box that is normally hidden and that pops up only when the cursor hovers over the pixel(s) in the source image that are identified as containing the boat access.

The pick-packet-generating software processes combinations of objects in the same manner as it processes a single object. Each unique pixel is associated with a unique token, a "unique" pixel being one that contains an initially unique particular single object or particular combination of objects. Multiple pixels containing the same particular combination of objects are then all associated with a common token. The process of assigning tokens to pixel coordinates is repeated for all pixels in the image, reusing existing tokens whenever a previously encountered combination of objects is found. For the sake of illustration, let's say a map shows a road crossing a river. Each pixel coordinate of a pixel that contains the two objects, road and river, will be assigned a common token. If one or more of the pixels showing road and river also contains has a particular additional object at any of the locations, a different token will be assigned to the corresponding pixel coordinates for the pixels that contain the road, the river, and the particular additional object. Once the entire image is processed and the total number of unique combinations is known, the number of unique tokens assigned in the pick packet matrix is computed. This step is done once.

The third step of the method according to the invention is to convert the pick packet matrix and the summary data table into the text files or string buffers that make up the final pick packet file. Browsers handle character strings very efficiently. The pick packet is manipulated via Java Script in a web browser, and, since Java Script works with character strings, the pick packet matrix and the summary data table are each converted to a text file that is a string of characters. The pick packet text file or string, also referred to as a primary buffer, is compressed with standard run-length encoding (RLE). The total number of tokens is placed at the start of the string. This information indicates how many characters are required to represent each token. Each character is typically 8-bits in length, allowing for 232 unique values. The pick-packet-generating software keeps track of the number of tokens used to identify the objects in the source image. A simple method is to use numbers as tokens, the first token being "1", the second one being "2" and so on. The largest token used is then the token count. The software needs to know the total token count, in order to determine the number of characters needed for a token. The number of unique characters available in the ASCII character set is 232, with the highest character being "255." This highest character, 255, is reserved as a flag. If the source image contains many objects and combinations of objects, and more than 232 tokens are needed to create the pick packet matrix, the 255 indicates to the pick-packet-generating software that the token is encoded across two characters. Each token is converted to its character form and placed in the pick packet text file, behind the total number information. The output of this conversion process is then shrunk by compressing runs of characters, using RLE. Once the primary buffer is completely converted to string form and compressed, the resulting string is stored to disk as the compressed pick packet file.

As mentioned above, the pick-packet-generating software creates a separate summary data table as it goes through the process of assigning tokens to pixel coordinates in the pick packet matrix. The summary data table contains a description for each token used in the pick packet matrix. The description is a user-friendly text description of the object or objects identified by the token. So, for example, if token "X" identifies a pixel that contains primitives for the objects bridge, rail line, and road, the description will contain the legend that is intended to be visible to the viewer when the cursor hovers over any pixel with this token. This summary data table is also written to a string buffer, referred to as the secondary buffer, again converting the tokens to their character form. The resulting string is then compressed and saved to disk as the compressed summary data file.

Use: After displaying the source image, the compressed pick packet file and compressed summary data file are first read into memory as two strings in Java Script. The beginning of the pick packet file is inspected and the total number of tokens and token size in characters are determined. The compressed pick packet file and the compressed summary data file are then decompressed into the primary buffer and the secondary buffer, whereby each pixel in the source image is now represented by a character token in the primary buffer. To determine pick information for a particular pixel in the source image, the browser inspects the corresponding coordinate in the primary buffer and retrieves the corresponding pixel token retrieved. The token's description is retrieved from the secondary buffer and the text description is displayed to the viewer.

Because of the iterative, looping process, intermediary tokens may be generated, which later have no use. For example, when identifying the pixels that are occupied by the primitives that represent a bridge, those pixels will be given a token that identifies "bridge", but later, after going through all primitives, it may turn out that every single pixel that was given a token that described just the bridge object has been replaced by a token that identifies the "bridge" and one or more other objects, such as a rail line or a river. It may be desirable to keep the summary data file as small as possible. In that case, the pick-packet-generating software removes all tokens that are not used.

It may also be desirable to limit the maximum number of objects identified on a pixel. In this case, a special marker token that indicates "too many objects" is used. The token is used, regardless of the particular objects at the particular pixel. Whenever the cursor hovers over a pixel that has this token, no description is called up. During the looping process, if this token is already applied to a pixel, the pick packet software stops looking for other applicable tokens for that pixel.

BRIEF DESCRIPTION OF THE DRAWINGS

The present invention is described with reference to the accompanying drawings. In the drawings, like reference numbers indicate identical or functionally similar elements.

FIG. 2B illustrates the status of the pick packet matrix after processing the second object.

FIG. 2D illustrates the status of the pick packet matrix after processing the fourth object.

FIG. 3A illustrates the summary data table after processing the first object.

FIG. 3B illustrates the summary data table after processing the second object.

FIG. 3C illustrates the summary data table after processing the third object.

FIG. 3D illustrates the summary data table after processing the fourth object.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

The invention is a method of returning unique pick information for each pixel location in a source image displayed in a web browser. The method comprises the steps of generating a pick packet matrix and a summary data table from rendering software, converting the pick packet matrix to a primary string buffer and the summary data table to a secondary string buffer. The web browser uses the two buffers to quickly and efficiently present legends relating to selected objects.

Figure 1:
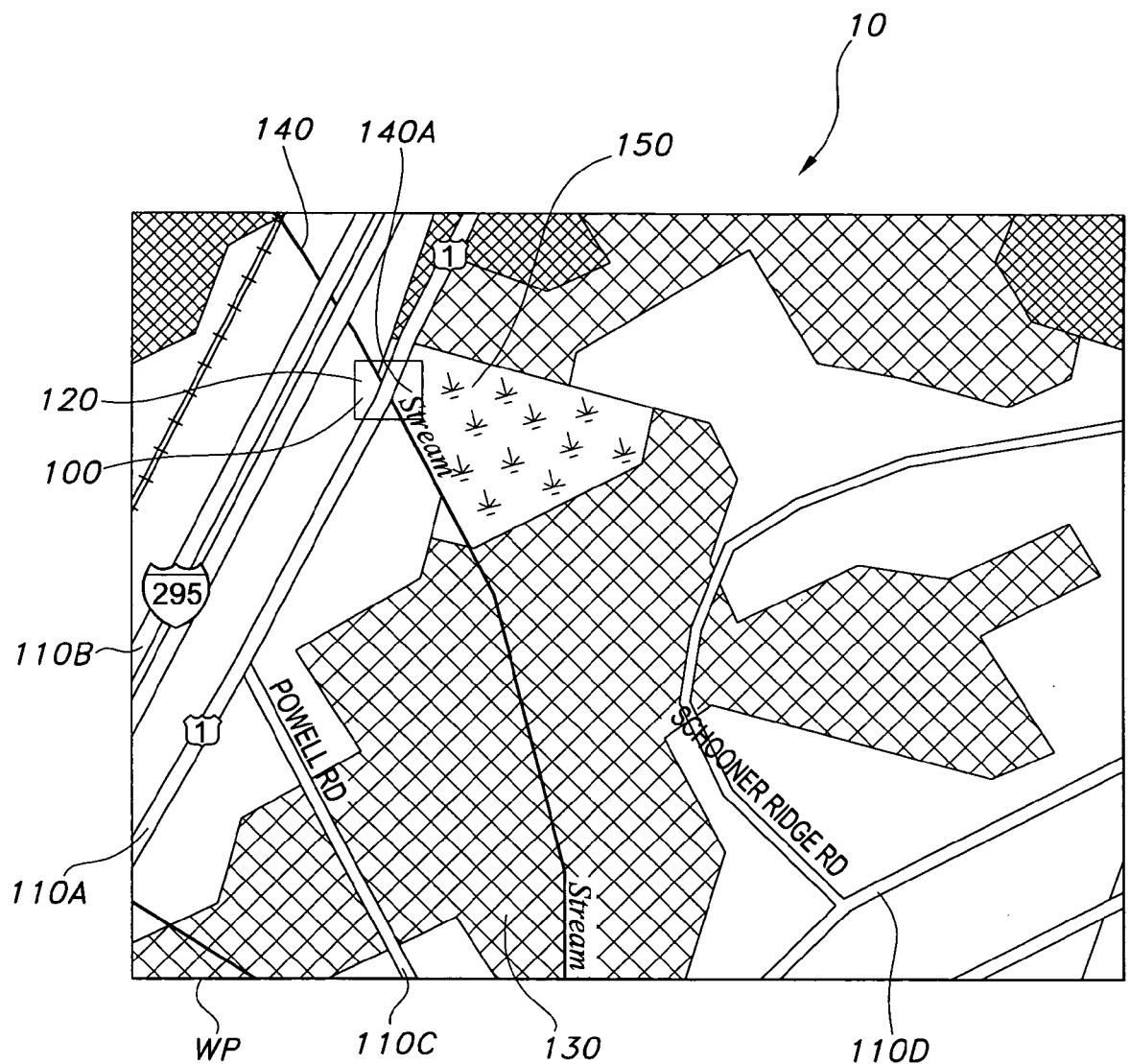
FIG. 1 is in illustration of a map on a web page, with multiple objects embedded in the map.

FIG. 1 shows a source image 10 displayed on a web page WP. The source image 10 is depicted as a road map for illustration purposes only. As mentioned above, the depiction of a road map is in no way limiting to the scope of the invention. It is understood that the method according to the invention may be applicable to any source image that is presented on a web page and provides some interactivity with the view via a web browser. The source image contains various objects, for which legends are to become visible in response to some particular action by the viewer. The objects in the source image may be located next to each other in a single layer, or layered one over the other, such that primitives for two or more objects are contained on a single pixel.

Numerous topographical features 110-150 are shown on the source image 10, such as, for example, roads 110A-110, fields 120, wooded area terrain 130, a stream 140, and a swamp 150. As can be seen, the roads are long, at times irregularly shaped lines that traverse relatively long distances across the web page WP. A selected area 100 is shown on the map 10, which shall be used to illustrate the method of the present invention; thus, the pick packet data presented below will be limited to the objects shown in the selected area 100.

FIGS. 2A-2D show the development of a pick packet matrix 200, which is the generated as the basis for the pick packet or primary string buffer used by the browser. FIGS. 3A-3D show the development of a summary data table 300, which is a cross-reference of each object or combination of objects, its assigned token, and the descriptive text, if any, that is associated with that token. FIGS. 3A-3D correspond to the status of the pick packet matrix 200 that is shown in FIGS. 2A-2D, respectively. The selected area 100 is composed of a matrix of 27 rows and 34 columns of pixels, each pixel containing one or more objects. A pixel in the source image is referred to hereinafter simply by its row and column number. For example, the first pixel in the selected area is referred to as pixel 1/1. The pick packet matrix 200 is a matrix of pixel coordinates P1/1-P27/34, each pixel coordinate corresponding to a pixel in the selected area 100. Pick-packet-generating software searches the selected area 100, object by object, based on a list of objects taken from the rendering software, to determine which pixels contain which objects. Each object or combination of objects is listed in the summary data table 300 and a token assigned at some point to each object or combination of objects. These tokens are placed in the pick packet matrix 200 as a means of associating a particular legend or descriptive text with a particular object or combination of objects in the selected area 100.

Referring again to FIG. 1, the embedded objects in the selected area 100 include the field 120, the road 110A, which crosses over the stream 140, and the swamp 150, which borders one side of the stream 140. Before assigning tokens, decisions were made not to evoke a legend for the field 120 and the swamp 150, and to evoke certain legends for the road 110 and the stream 140.

Figure 2A:
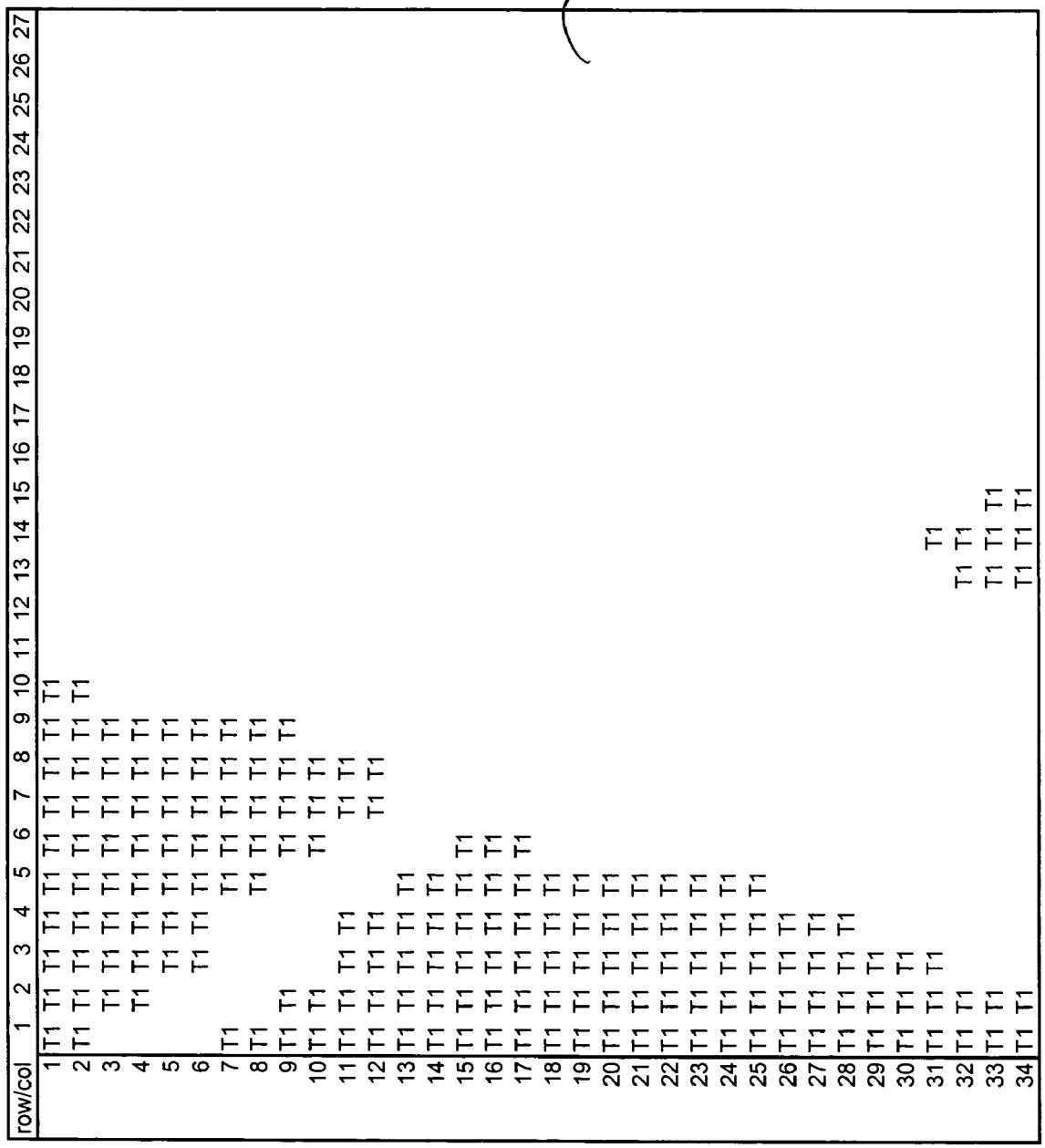
FIG. 2A illustrates the status of the pick packet matrix after processing the first object.

FIGS. 2A and 3A illustrate the status of the pick packet matrix 200 and the summary data table 300 after the pick-packet-generating software has completed its search for the first object. The first object the pick-packet-generating software looks for is the field 120. This object is chosen arbitrarily, for illustration purposes only. In reality, the pick-packet-generating software may have a pre-determined sequence of objects to work through. The first object field 120 is found on the first pixel 1/1 in the selected area 100. The pick-packet-generating software first looks at the pick packet matrix 200 to determine if a token has previously been assigned to the pixel coordinate P1/1. In this first loop, no tokens have been assigned to any pixel coordinates. The pick-packet-generating software then goes to the summary data table 300 to see if a token has been assigned to object 120. If a token had been previously assigned to this object, the pick-packet-generating software would place that token at the corresponding pixel coordinate P1/1. Again, at this point, the summary data table 300 is empty, because no tokens have been assigned to any objects. This first object field 120 is placed in the summary data table 300 and the first available token T1 assigned to it, as shown in FIG. 3A. This same token T1 is now placed at the pixel coordinate P1/1 in the pick packet matrix 200. The pick-packet-generating software then goes back to the selected area 100 to find the next pixel that contains the same first object, and then inspects the corresponding pixel coordinate in the pick packet matrix 200 to determine if a token has already been assigned to that pixel. This step is repeated for every pixel in the selected area 100 that contains the object field 120. Since the process of assigning tokens to objects has just begun, no pixel coordinate that contains the first object, field 120, will have another token assigned to it, so, when this step is completed, the pick-packet-generating software has assigned the token T1 to every pixel coordinate in the pick packet matrix 200 that contains the field 120, as shown in FIG. 2A.

Figure 2B:
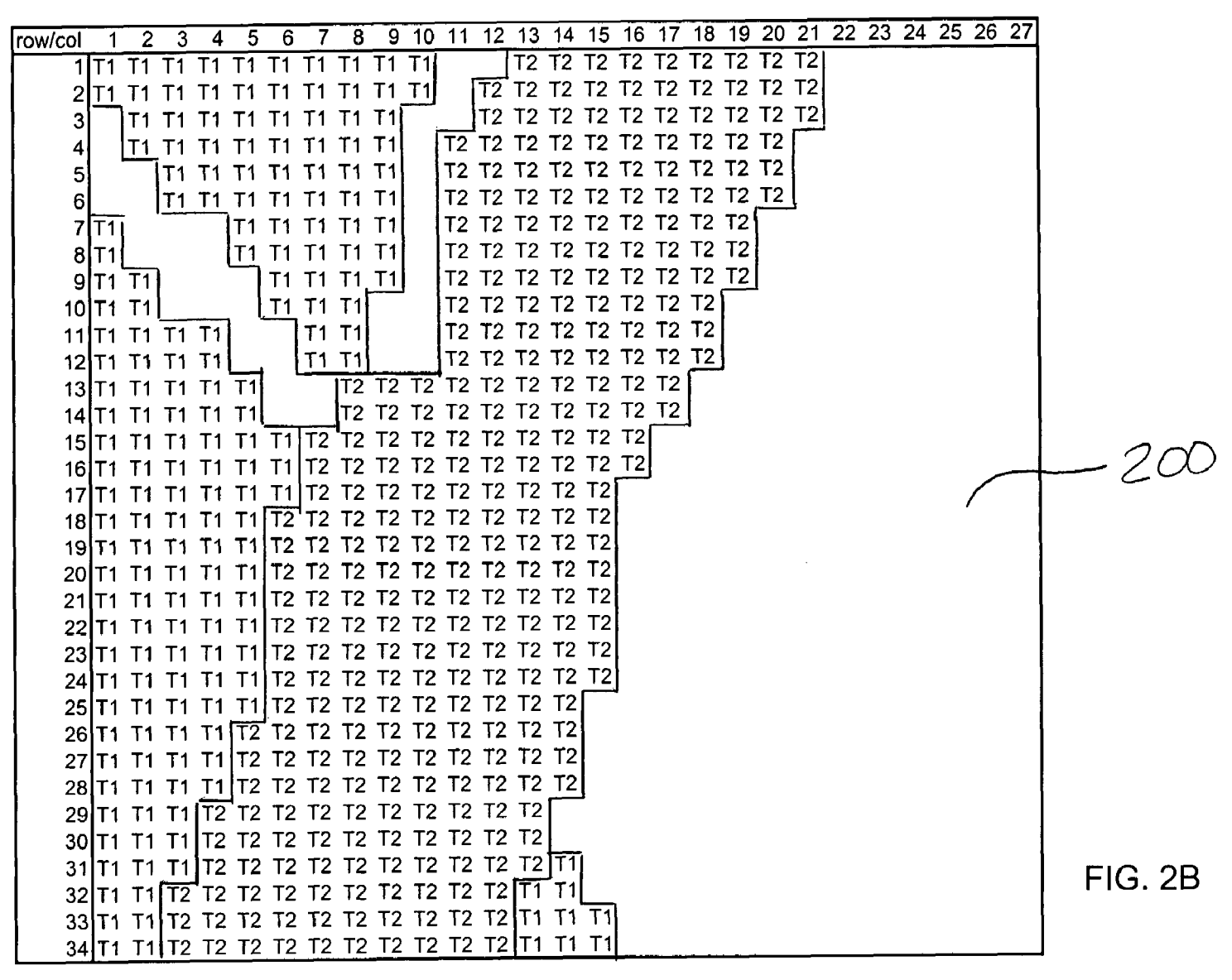

FIGS. 2B and 3B illustrate the status of the pick packet matrix 200 and summary data table 300 after the search for the second object, the road 110A, which is found in the selected area 10 at pixel location 1/13. As described above, the pick-packet-generating software first looks at the pick packet matrix 200 to determine if a token has previously been assigned to this location, in this case no token has, so the pick-packet-generating software then looks in the summary data table 300 to determine whether a token has already been assigned to the object road 110A. The object had not been previously encountered and, thus, had not yet been placed in the table 300. The object road 110A is now placed in the summary data table 300, and the next available token T2 is assigned to it, as shown in FIG. 3B. The token T2 is also placed at the corresponding pixel coordinate P1/13 in the pick packet matrix 200, as shown in FIG. 2B. At this stage of the pick packet generating process, other objects that are layered on a pixel together with the object road 110A have not been assigned a token. Consequently, the pick-packet-generating software assigns the token T2 to every pixel coordinate in the pick packet matrix 200 that corresponds to the pixels in the selected area 100 that contain the road 110A.

Figure 2C:
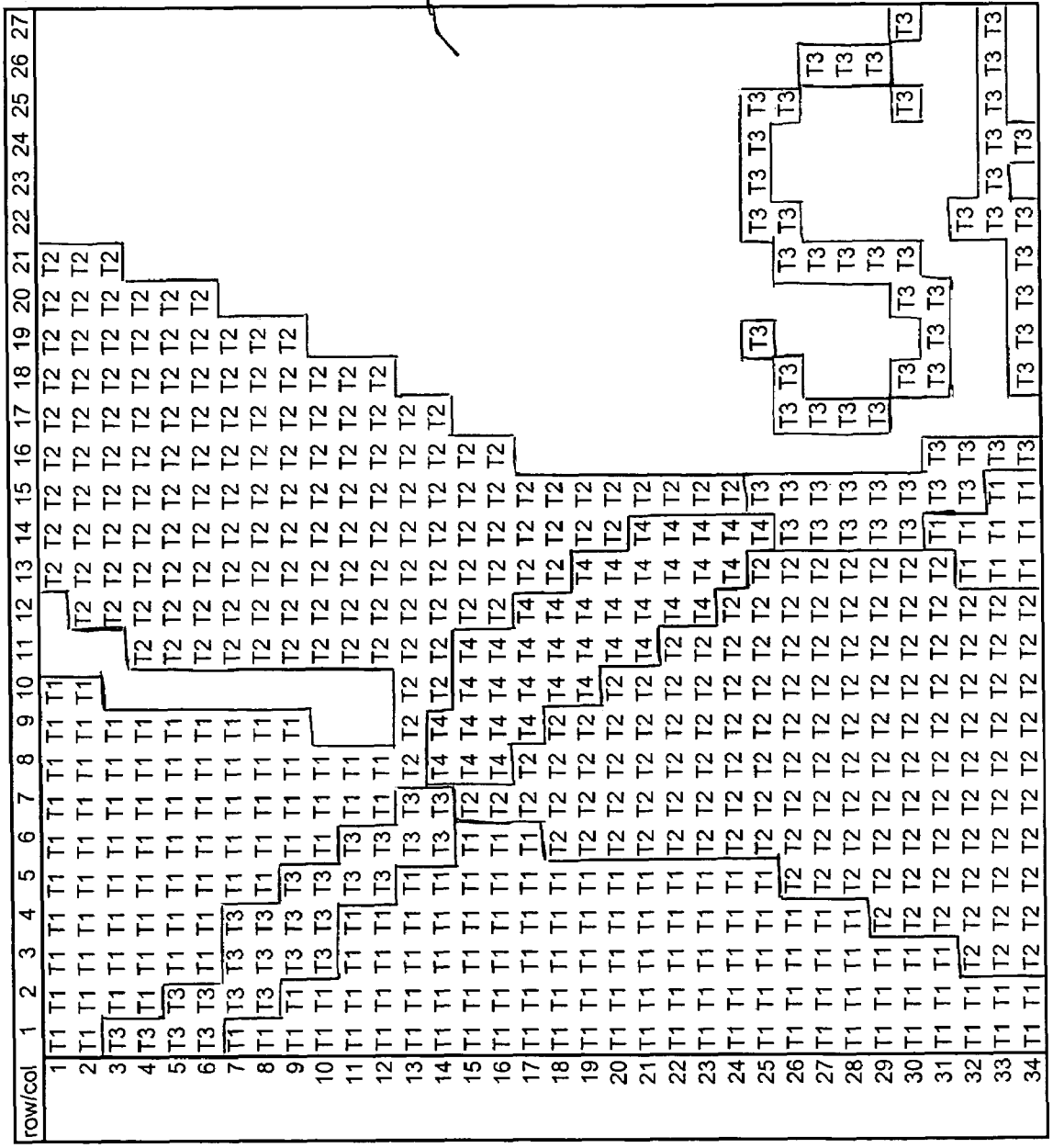
FIG. 2C illustrates the status of the pick packet matrix after processing the third object.

FIGS. 2C and 3C illustrate the status of the pick packet matrix 200 and summary data table 300 after the search for the third object, the stream 140. As described above, the pick-packet-generating software checks the summary data table 300 to see if a token has already been assigned to the stream 140, sees that no token has been assigned, and assigns the next available token T3 to the object stream 140. It then looks at every pixel in the selected area 100 that contains the object stream 140. For those pixels which contain only the object stream 140, the pick-packet-generating software assigns the token T3 to the corresponding pixel coordinates in the pick packet matrix 200. When looking at a pixel that contains the object stream 140, and another object, such as the object road 110A at pixel location 14/8, the pick-packet-generating software checks the packet-matrix 200 for the token currently stored at that location. T2 is found in this example. The pick-packet-generating software then looks up the existing token T2 in the summary data table 300 to see if it contains the combination of objects represented on the pixel. For the present example, the only object found associated with T2 is road 110A. The pick-packet-generating software computes the combination of objects that presently occupy that pixel 14/8 and checks in the summary data table to see if a token has been assigned to that combination of objects. If none has been assigned, it assigns the next available token to the combination and eventually places that token at all pixel coordinates in the pick packet matrix 200. that correspond to pixel locations that contain that combination of objects. In the illustrations shown in FIGS. 2C and 3C, the pick-packet-generating software assigned a new token, T4, to the object combination road 110A and stream 140 and then placed that token at each pixel coordinate that represents that particular combination of objects. Thus, the previously assigned token T2, for example, is replaced with the new token T4 at pixel coordinate P14/8 and at all other pixel coordinates that represent the combination of objects road 110A and stream 140.

Figure 2D:
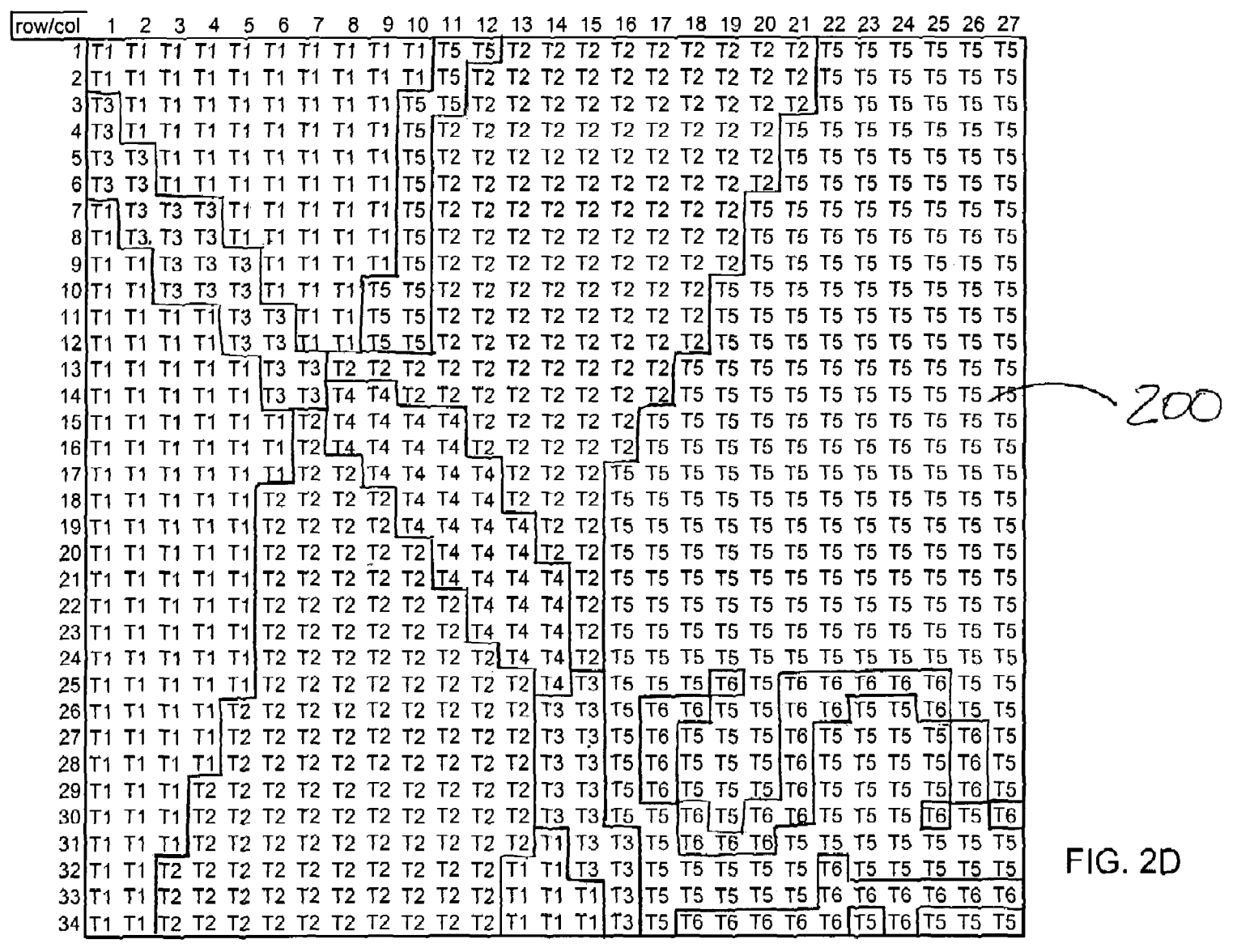

FIGS. 2D and 3D illustrate the status of the pick packet matrix 200 and the summary data table 300 after the search for the fourth object, the swamp 150. The token T5 is assigned to every pixel coordinate that corresponds to the pixel location of the swamp 150 in the selected area 100, and the token T6 assigned to those pixels that contain the object combination swamp 150 and stream 140. The previously assigned token T5 is now replaced by the token T6 at each pixel coordinate that represents the object combination swamp 150 and stream 140.

The intention of the web page designer is to have certain legends appear to the web page viewer, when the viewer allows the pointer device to hover over certain embedded objects, regardless of whether the embedded objects are actually visible to the viewer on the screen. For example, the pointer device hovering anywhere along the road 110A shall evoke the legend "US Route 1", and hovering anywhere along the stream 140 shall evoke the legend "Sandy Brook". The pick-packet-generating software may be programmed to recognize that certain combinations of objects automatically define a new object. For example, the software recognizes that a road crossing over a waterway defines a "bridge". The legend may now include descriptive text for both the road 110A and the stream 140 and display "US Route 1, Sandy Brook", or it may display "Sandy Brook Bridge" for this combination of objects. For some features, the decision is made not to associate a legend with them. For example, the tokens T5 and T1 that identify the areas of the swamp 150 and the field 120, respectively, shall evoke no legend.

In the illustrations described above, the pick-packet-generating software looked at "objects" in the rendering software. The rendering software may also contain legends that are rendered on the source image 10 and a token may just as well be associated with these legends. For example, the word "Stream" is rendered on the source image 10 and the selected area 100 includes the first letter "S". In the FIGS. 2A-2D, this letter was also assigned the token T2 that is used to identify the stream 140. The pointer device hovering over the word "Stream" will evoke the legend "Sandy Brook".

Once each pixel coordinate in the pick packet matrix 200 has been assigned a token, the pick-packet-generating software computes the token count, that is, the number of different tokens that have been used to identify objects and combinations of objects in the pick packet matrix 200. The token count is used by the pick-packet-generating software to determine the minimum number of characters necessary to identify a token. If fewer than 232 tokens are used, the token may be encoded with a single character because the standard ASCII code contains sufficient number of characters to do this; if greater than 232 tokens, the token must be encoded across two characters. It is possible that, during the matrix generating process, a token may initially be assigned to an object in the summary data table 300 and to a pixel coordinate, and then subsequently be eliminated from the pick packet, because that object is found only in combination with other objects, so that the token originally assigned to the object is overwritten in every instance. The pick-packet-generating software goes back and inspects the summary data table 300 for any tokens not used in the final pick packet matrix 200. Such unused tokens may then be deleted from the summary data table, to keep the pick packet data as small as possible.

After the pick packet matrix 200 has been completed, that is, fully populated with tokens, it is converted to a pick packet text file. Each token used in the pick packet matrix 200, in this case, T1-T6, is converted to its character form and the string of token characters written to a string buffer, which is the pick packet text file. This pick packet text file is compressed to a compressed pick packet file and then stored as the primary buffer. The summary data are also converted to character form, compressed, and stored as the compressed summary data or secondary buffer.

When the source image 10 is displayed on a browser, the primary buffer and the secondary buffer are read into memory as two strings in Java script. The beginning of the primary buffer is inspected and the token count ascertained. The primary buffer is decompressed into the pick packet text file, and the secondary buffer decompressed into the summary data text file. When the pointer device hovers over a particular pixel, the browser inspects the corresponding pixel coordinate in the primary buffer and retrieves the pixel token. The browser then retrieves the text description from the secondary buffer and displays it to the viewer.

It is understood that the embodiments described herein are merely illustrative of the present invention. Variations in the execution of the method may be contemplated by one skilled in the art without limiting the intended scope of the invention herein disclosed and as defined by the following claims.

What is claimed is:

1. A method of generating a pick packet for use with a web browser, said method comprising the steps of:
    (a) obtaining from source-image rendering software a list of objects displayed in a source image that was generated by the source-image rendering software, said source image comprising a plurality of pixels, wherein at least one object is embedded on one or more of said pixels, and wherein the at least one object is an object defined by data that is processed by the source-image rendering software;
    (b) generating a secondary text file that contains a list of unique tokens, wherein a unique token is assigned to a unique object that is single object or a combination of objects, said unique object being displayed on one or more pixels in said source image, and wherein a legend is associated with one or more of said tokens;
    (c) generating a primary text file that contains pixel coordinates, a first pixel coordinate corresponding to a first pixel in said source image, a second pixel coordinate corresponding to a second pixel in said source image, and so on;
    (d) identifying a first object from said list of objects;
    (e) inspecting said source image for a first-object pixel in said source image, said first-object pixel containing said first object;
    (f) inspecting said primary text file at a first object pixel coordinate for a first-object token, said first-object pixel coordinate corresponding to said first-object pixel and said first-object token corresponding to said token assigned to said unique object that represents said first object;
    (g) retrieving said legend associated with said first-object token from said secondary text file; and
    (h) displaying said legend to a viewer of said source image, when said viewer calls for said legend at said first-object pixel by hovering a pointer device over said first-object pixel containing a particular object.

2. The method of claim 1, wherein said step of generating said secondary text file comprises the steps of:
    b1) creating a summary data table;
    b2) finding an object in said list of objects and placing said object as a unique object in said summary data table;
    b3) assigning said token to said unique object in said summary data table, a first token being assigned to a first unique object, a second token assigned to a second unique object, and so on analogously; and
    b4) associating said legend with each said token, a first legend being associated with said first token, a second legend with said second token, and so on.

3. The method of claim 2, wherein said step of assigning said token to said unique object includes the steps of:
    b5) inspecting said summary data table for a token assigned to said unique object; and
    b6) if no token is assigned, assigning a next available token to said unique object.

4. The method of claim 2 further comprising the step of
b7) converting said summary data table to said secondary text file.

5. The method of claim 4, said step of converting said summary data table to said secondary text file including the steps of:
   b8) determining a total token count of said tokens in said summary data table;
   b9) determining a number of characters necessary to encode each said token in said summary data table;
   b10) encoding each said token with a character identification; and
   b11) forming a character string that includes said total token count and said character identification of each said token.

6. The method of claim 5, said step of generating a primary text file comprising the steps of:
   c1) creating a pick packet matrix of pixel coordinates, a first pixel coordinate corresponding to a first pixel in said source image, a second pixel coordinate corresponding to a second pixel in said source image, and so on; and
   c2) determining which unique object is present on a particular pixel in said source image and assigning said token from said summary data table that is associated with said unique object to said corresponding particular pixel coordinate in said pick packet matrix.

7. The method of claim 6, said step of assigning said token to said particular pixel coordinate comprising the steps of:
   c3) inspecting said source image for a first particular object and a first particular-object pixel of said particular object;
   c4) inspecting a first particular-object pixel coordinate in said pick packet matrix, said first particular-object pixel coordinate corresponding to said first particular-object pixel, to determine whether a first particular-object token has been assigned thereto;
   c5) looking in said summary data table for said first particular object among said unique objects and said unique token that is associated with said first particular object;
   c6) assigning said token that is associated with said first particular object to said first particular-object pixel coordinate;
   c7) inspecting said source image for a second particular-object pixel that contains said first particular object;
   c8) inspecting a second particular-object pixel coordinate in said pick packet matrix that corresponds to said second particular-object pixel, to determine whether said token associated with said first particular object has been assigned to said second particular-object pixel coordinate;
   c9) assigning said token associated with said first particular object to said second particular-object pixel coordinate.

8. The method of claim 6 further comprising the steps of
   c10) converting each said token used in said pick packet matrix to said character identification of said corresponding token in said summary data table;
   c11) forming a character string comprising each said character identification of each said pixel coordinate from said pick packet matrix.

9. The method of claim 1, said step of retrieving said legend associated with said first-object token from said primary text file for displaying to a viewer of said source image, when said viewer calls for said legend at said first-object pixel, including the steps of:
   g1) compressing and storing said primary text file as a compressed pick packet file;
   g2) compressing and storing said secondary text file as a compressed secondary text file;
   g3) displaying said source image on a web browser;
   g4) decompressing said compressed pick packet file to said primary text file and decompressing said compressed secondary text file to said secondary text file;
   g5) reading said primary text file and said secondary text file into a memory;
   g6) retrieving a particular object token from said pixel coordinate in said primary text file, said pixel coordinate corresponding to said first pixel;
   g7) retrieving said legend corresponding to said particular object from said secondary text file; and
   g8) displaying said legend on said web browser.

* * * * *